United States Patent Office 3,161,466
Patented Dec. 15, 1964

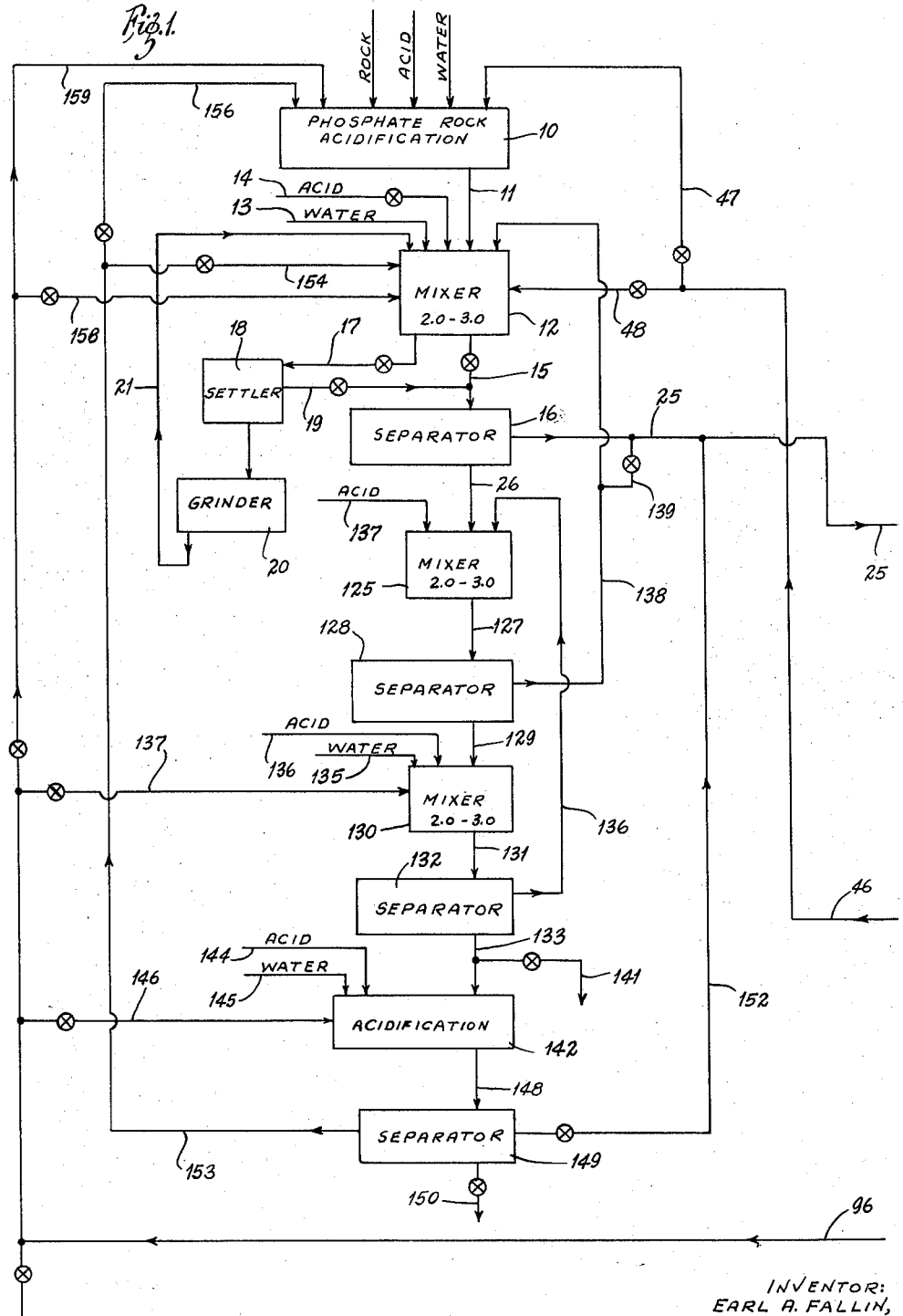

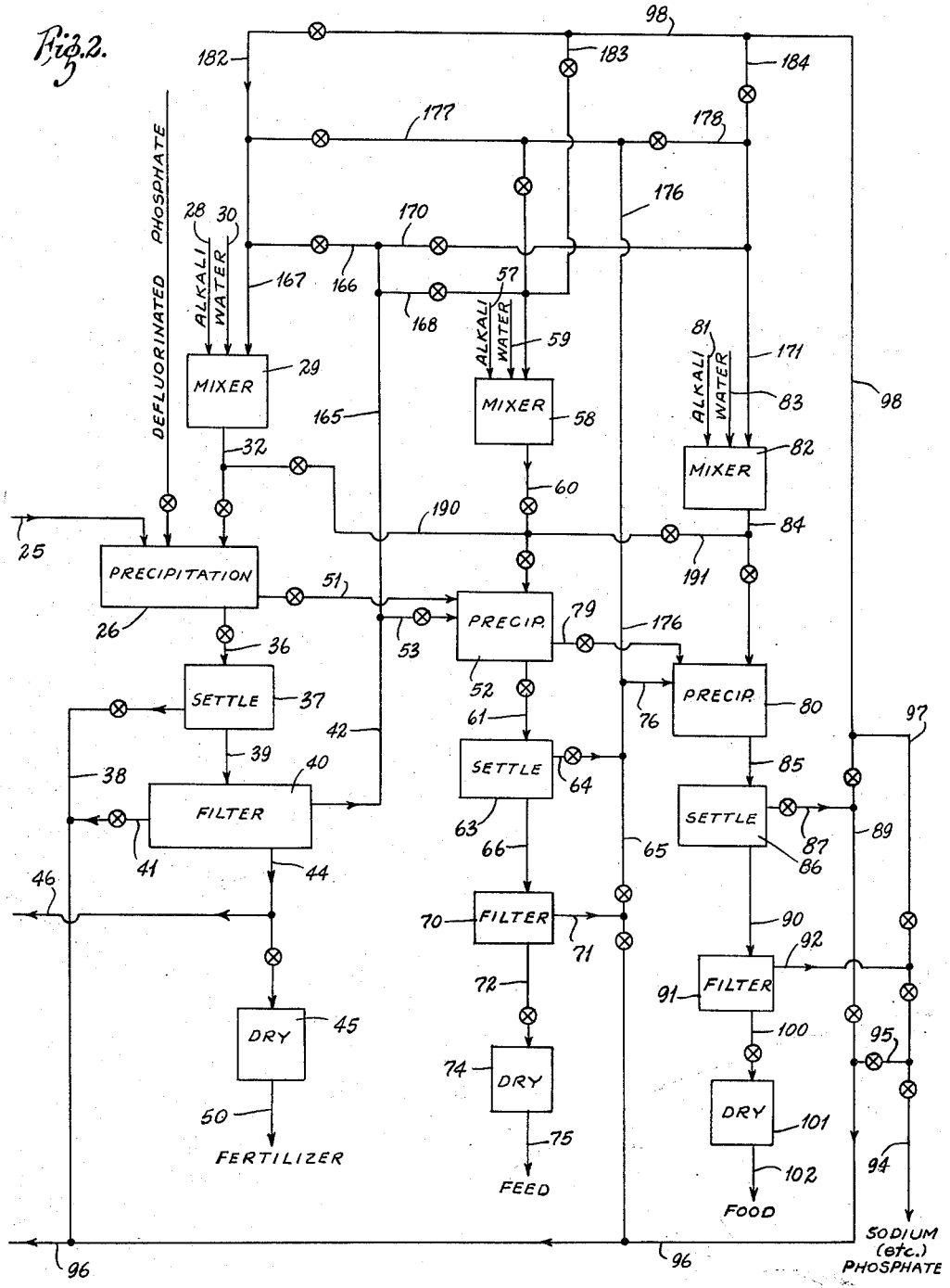

3,161,466
PRODUCTION AND PURIFICATION OF
PHOSPHATIC MATERIALS
Earl A. Fallin, 808 Rampart Drive, Kirkwood, Mo.
Continuation of application Ser. No. 768,162, Oct. 20,
1958. This application Jan. 26, 1961, Ser. No. 86,250
11 Claims. (Cl. 23—109)

This invention is particularly applicable to the production of dicalcium phosphate but, as will appear, it can produce other end products than dicalcium phosphate; and it includes certain improvements in intermediate steps in the purification process that can be used whether the ultimate product be dicalcium phosphate or some other material, the processing of which involves similar problems.

This application is a continuation-in-part of application Serial No. 423,767, filed April 16, 1954, now Patent No. 2,857,245, October 21, 1958, and a continuation of application Serial No. 768,162, filed October 20, 1958. The additions in the present application include certain alternatives and improvements in the process set forth in the patent which can render it even more flexible and efficient than in the form described in that patent, even though the disclosures of that patent represent distinct improvements over prior procedures.

Taken from its most primary status through its most ultimate steps, the present process can begin with the step of acidification of raw phosphate, such as phosphate rock. The acidified material is mixed in a manner to regulate the acidity and is leached at controlled acidity to give a liquor that is relatively high in phosphate and a slurry containing some phosphate and the major part of the critical impurities, particularly the fluorides.

The liquor from the leaching stage is then carried to one or more stages of purification. In each stage of purification, material of higher pH is added to decrease the acidity to a limited degree. The mass is then transferred to settling and separating means, where it may be separated into a filtrate and a separable product.

The purity of separable product increases in the successive stages. The filtrate liquor from any early stage is drawn off and used in earlier parts of the system, or it may be transmitted to a subsequent purification stage, and then further reduced in acidity to permit separation of additional separable product material of greater purity. In such succeeding stages, the heavier components may be separated from the liquor, dried and appropriately converted into an end product such as dicalcium phosphate, or a mixture of phosphates, depending upon the choice of alkali used. The liquor from this stage may be carried to additional stages, wherein there is a further reduction of acidity, followed by separation out of an even purer phosphate product.

Normally, the product from the first stage of purification is relatively impure and may be useful as fertilizer, or an intermediate product for further processing. The solids from subsequent stages are purer and may be used as animal feed, and for human use or consumption, depending upon the degree of purity.

Essentially each stage of purification starts with a phosphatic liquor, adds a material to increase the pH and permit separation into a separable product and a liquor filtrate, which latter may contain a product for removal or use in the process (this being subject to some variation as will appear). Also, as will appear, any stage of purification may be partially or wholly by-passed.

The foregoing discusses the treatment of the phosphate-containing liquor from a leaching stage. The heavier components obtained from the leaching stage, possibly subjected to partial regrinding, are conveyed through a series of separators and treated by a countercurrent liquid. This liquor comprises water, acid, and such other materials as will appear, so as to provide desirably regulated acidity in the separators, to insure separation of impurities with the heavier components and maintenance of the larger part of the phosphate with the liquid. The liquor, containing valuable phosphate materials, but relatively free of impurities such as fluorides because of the acidity control, is conveyed to the purification stages, along with the principal monocalcium phosphate produced in the first stage leaching tank or separator. From the last stage separator, the heavies may be conveyed to an acidification mixer where they are finally acidified to insure a pH of only about 2.0, and then are conducted to a separator.

This treatment of the heavies from the leaching also results essentially in the production of a liquor and heavies. However, the liquor here contains the principal amount of phosphates, while the heavies constitute the less valuable product.

From the final separator, the solids may be conveyed out of the system possibly as waste. It is a feature of this process that the liquor from the final mild acidification of the impurity-containing heavies of the washing can be used earlier in the process for regulation of acidity and as a source of acid. As an alternate this liquor can be purified before returning to the process.

One of the advantageous steps in the present process has been above described and comprises the countercurrent washing of the phosphate-containing waste impurities from the leaching stage, to redissolve the phosphate. It is especially desirable to perform this with the addition of acid and the controlling of the acidity of the countercurrent washing. It is, therefore, an object of the present invention to provide a process of the foregoing type wherein there is conuntercurrent washing of the waste from the initial stage of dilution of monocalcium phosphate, especially with controlled regulation of acidity throughout the washing operation, to obtain increase in the yield of dissolved phosphorous materials, without excessive increase of undissolved contaminants.

It is a particular object to accomplish the foregoing by a controlled countercurrent washing process in which acidity may be regulated by addition of aqueous liquors obtained from one or more of the subsequent stages, especially the liquors having known acidities as high as or somewhat higher than the desired pH for the washing liquor in question.

It is a further object to improve the foregoing yield of dissolved phosphorous materials by a control of the pH as aforesaid in each stage of washing, and in the steps of formation and separation of the fresh acidulated phosphate source.

Another object of the present invention is to use the filtrate or liquor removed from the dicalcium phosphate, or from the purification stages, in such wise as to benefit from its existing pH value and other properties, in other stages of the process. A first object is to use the liquor removed at a more or less intermediate pH value, such as that from early purification stages, as a liquor in a prior stage of the process such as the stage wherein occurs moderate acidulation of the waste matter from the monocalcium phosphate leaching stage.

Another object is to benefit from the properties of the liquor removed from later stages to accomplish better separation of heavies containing impurities from the liquor containing phosphate. Also, where the final filtrate contains water soluble phosphate products to be recovered, less water has to be removed if this liquor is recirculated to increase the concentration of the desired water soluble product. It is further an object of the invention to use filtrates from the later purification stages, having higher pH values and probably containing fine solid particles of phosphates, as a carrier or diluent for the alkali added to the purification stages. Stated differently, the object is to use this purification stage liquor in such wise as to recover the small phosphorous particles into the system, as well as to make it possible for them to be converted to larger, and therefore more usable, phosphorous particles.

Another object of the invention is to use an inexpensive basic phosphate material as an aid in purifying phosphate liquor at a stage wherein alkali is added to raise the pH. Especially, it is an object to use defluorinated phosphate for this purpose.

It is a further object to provide a process and apparatus which will permit the processing of two kinds of phosphates at the same time by the addition of appropriate alkali or alkalis to the phosphate liquor.

Another object is to provide a process which may be operated to leave dicalcium phosphate in other products, such as sodium phosphates. The purpose of this is to provide materials such as cleansers, washing products or detergent that contain highly desirable abrasion components in the form of dicalcium phosphate fines. Another purpose is to have a phosphate product lower in calcium content than is possible with all the phosphorus being in the form of dicalcium phosphate.

It is a further object of the invention to provide a process in which the purification stages may be conducted by alkalizing with materials such as calcium oxide, calcium hydroxide, calcium carbonates, and by-products lime, magnesia, and alkaloids and the like.

It is an object of this invention to be able to use materials as alkalis that normally would not give sufficient reaction with the dilute phosphate solutions found in the present process, and specifically to enable alkaline materials such as limestone or soda ash to be used readily. This object is here attained by heating the alkali or base material before it is added to the phosphate solution.

A more specific object is to reduce the amount of heating required to effect ready reaction of the more alkaline material and the dilute phosphatic material by heating only the alkali before it is added to the dilute phosphate.

Another object of the invention is to provide a process which can enable a product to be produced that is higher in palatability and granulation. Specifically, it is an object to provide a process employing starch, molasses, sugar, and the like, and particularly to do so in a manner causing the liquor left on the dicalcium to perform a binding action wherein the dicalcium particles are cemented together.

Many other objects and advantages will appear from the description to follow.

The drawings of FIGURES 1 and 2, wherein FIGURE 2 comprises a continuation of FIGURE 1, represent a schematic flow sheet of the procedure.

In this description, the process and apparatus will first be described to give an over-all understanding thereof. Thereafter, more detailed explanation of particular aspects of the process will be given.

*Manufacture of Phosphatic Liquor*

This flow chart is diagrammatic. For simplification, the valves have not all been represented. However, the valve symbol has been shown when it appeared to aid the understanding of the system. The valves may be any appropriate form of throttling and cut-off devices.

In the upper left corner of the flow chart is shown a phosphate rock acidification block 10. Into this are loaded phosphate rock, in a broken-up condition, water, and an acid as the starting constituents of the process, this being the familiar rock acidification process for producing monocalcium phosphate. Typically and preferably, for many reasons, especially that of economy, the acid used is sulfuric acid. However, as will appear, other acids may be used, such as phosphoric, nitric, hydrochloric, various mixtures, by-product acid, etc. The pH is low, in the range of about 2 to 3.

Typically the materials in the acidification tank are pasty. They may be left to stand for a number of hours during which they "age" and lose some fluorine; but such aging can be dispensed with by using the features of the present invention. These essential components, possibly with certain recirculated materials as will later be described, are then conducted by a pipe 11 to a mixer 12, wherein they are mixed and diluted with an aqueous diluent. The water may be added in the mixer 12 by way of a pipe 13, but the preferred source is from a countercurrent washing subsequently described. There may also be some recirculated liquors as will later appear. The pH may rise to around 3.0 in this stage, and should be kept between 2.0 and 3.0 to minimize impurities in solution. Acid (one of the aforementioned acids) may be added, if needed, from a source 14.

The mixed and diluted components are then delivered by a pipe 15 to a separator stage 16. Since there may be substantial quantities of relatively small phosphate-containing particles in this mixer 12, that are very hard to dissolve, it is desirable to direct the mass by a pipe 17 from the mixer 12 to a classifier or settler 18, rather than directly by the pipe 15 to the separator 16. In the classifier, the aforesaid particles, which usually are 200 mesh or larger, settle out while the remaining liquor and fines flow by a pipe 19 into the pipe 15. The coarse particles from the settler 18 then are directed into a grinder 20, and thence by a conduit 21 back into the mixer 12. By this arrangement, the resistant particles are mechanically opened up to condition to be reacted with acidic liquor, and the phosphate therefrom recovered. In the system, only a small part of the total mass need be passed through the grinder.

In the separator 16, there is separation of a phosphate-containing liquor (generally monocalcium phosphate), which may flow from the top, and impure heavies which may flow from the bottom. These heavies contain a large part of the impurities, especially the fluorines. In practice, it will appear the pH within the separator should be maintained at between 2.0 and 2.2.

It is from the separator, therefore, that the present process obtains the two primary divisions which consist of the phosphate-containing liquor, usually monocalcium phosphate carried out by the pipe 25, and the impurities-containing heavies conducted out by the pipe 26'. Usually, the principal end products sought are obtained from the liquors that are conducted to the purification stages through the pipe 25. Therefore, this description will first follow that liquor.

*Purification of the Phosphatic Materials From the Liquor*

The liquor from the pipe 25 is delivered into a first purification stage precipitator 26 wherein the pH is raised a limited amount, so that, typically, it is 2.7–2.9, but may reach a maximum of about 3.25. This is accomplished by the addition of a higher pH material, typically an alkali. In the flow sheet, it will be noted that above the precipitator 26 there is an alkali inlet pipe 28 entering a mixer 29. As will later appear, certain recirculated liquors may also be introduced into the mixer 29 by connections to be described. Also, water may be added from a source 30. The object is to obtain an alkaline liquor of appropriate nature to raise the pH in the precipitator 26 to the point indicated, so as to obtain the separation of impurities from phosphatic materials.

In the alkali mixer 29, the alkaline and other components are thoroughly mixed and delivered to a pipe 32, either with or without separating out coarse and/or undissolved particles. This pipe can, through a valve, deliver the liquor to the precipitator 26, wherein the alkali is thoroughly mixed with the phosphate liquor in a manner to minimize uneven raising of the pH thereof.

The purpose of raising the pH of the phosphatic liquor in the first purification stage precipitator 26 is to precipitate impurities, comprising fluorine compounds primarily, but also including others such as iron, aluminum, and the like, without precipitating large quantities of phosphorus compounds. The alkali introduced at 28 is actually a pH-raising material, and typically may be lime, sodium carbonate, and limestone. At a pH of 2.7–2.9 or thereabout, the fluorine and other contaminants will precipitate, while the principal phosphates remain in solution.

By adding a defluorinated phosphate such as tricalcium phosphate or hydroxy-apatite, in small quantities, to the material to be purified in the first stage from a source such as the supply 34, the fluorine tends to combine therewith, requiring less severe elevation of the pH. This is of importance, in that it reduces the amount of alkali required, and thereby reduces the risk of formation of substantial quantities of phosphates of a type that can go down with the impurities.

After thorough mixing in the precipitator 26, the material in the precipitator may be passed through a pipe 36 into a holding or settling tank 37, wherein the separation of solids from the liquor may take place quickly, especially if aided by inclusion of settling agents. The principal function of the precipitator is to insure a proper mixing of the incoming liquor and alkaline materials to escape undesirable conditions, as will hereafter be explained.

In the settling tank 37, there may be a liquor as well as a heavy, more solid component. The liquor may be quite clear. It can be drawn off through a pipe 38 for use in earlier stages of the system, as will hereafter be described. Or it may be included with the heavies in the tank 37 and conducted off by a pipe 39 to a separator 40, and there separated into a liquor and heavies or bottoms. From the separator 40, the liquor may be conducted by a pipe 41 into the pipe 38. Usually, this liquor is conducted by a pipe 42 leading from the right side of the separator 34 in the illustration to a second stage of purification, as will hereafter appear.

The heavies from the separator 40 leave by a pipe 44 and may pass into a processor here represented as the dryer 45. Or they may be conducted back to prior stages of the process for recovery of any valued constituents, as by the pipe 46, or processed by other means to recover any of the constituents therein that may be desired.

The pipe 46 connects by a pipe 47 into the initial rock acidification stage 10 (superphosphate manufacturing stage) or through a pipe 48 into the superphosphate dilution and separation stage at 12. This material in the pipe 46, ordinarily, will be relatively impure, although the degree of purity will depend upon the purity of the starting material and various processing controls. However, it has been through a purification stage operated at rather low pH, which permits precipitation of the fluoride and other impurities, but leaves much of the phosphate in the more purified liquor. After processing, the solids may be conducted by a pipe 50 out to a point wherein it may be packaged or otherwise handled. Normally, this would be considered a fertilizer grade material.

In cases where the purity of the phosphate liquor entering the precipitator 26 is of insufficient purity to make a product in demand and more than one stage of precipitation is desired, all of the contents of the precipitator 26 may be sent directly, by a pipe 51, to a second stage precipitator 52 for treatment to be described.

In the usual practice, however, the somewhat purified liquor from the separator 40 may be carried by the pipe 42 to a pipe 53 into the second stage mixer or precipitator 52. This liquor is there further neutralized, preferably by about 1.0 pH increment, to a pH of perhaps 4. To accomplish this, alkali of pH increasing material such as in the first stage is introduced by a pipe 57 to a mixer 58. In the mixer, water from a source 59, or other carriers such as suitable recirculated liquors, as will appear, may be added as desired. The resulting liquid is passed from the mixer by a pipe 60 into the tank 52 to bring the pH of the material up in a manner that will produce the best results, as will be described.

As in the previous purification stage, the material is thoroughly mixed in, and then conveyed from the precipitator 52 through a pipe 61 and a valve to a settling or holding tank 63. A thickener may be added in this tank. Liquor may be conducted from this tank 63 by a pipe 64 into a pipe 65 for purposes to appear.

The heavies, or all the material, from the settling or holding tank 63 are conducted from the tank 63 by a pipe 66 into a separator 70. The material in this separator is purer than that in the first precipitation stages, owing to elimination of much of the impure matter with the heavies in that earlier stage. From this separator 70, the liquor may be conducted out by a pipe 71 to the pipe 65, or to a pipe 72.

The heavies, including much phosphate product of improved purity, may be conducted out by the pipe 72 into a processor, here illustrated as a dryer 74. From the processor 74, the solid material may be conducted away by a conduit 75. While the material from the pipe 73 is of greater purity, under ordinary circumstances, it may be only useful as animal feed.

As noted, the liquor from the separator 70 can be conducted by a pipe 71 into the pipe 65, whence it may be conducted by a pipe 76 into the third purification stage precipitator 80. As will be noted on the drawing, when it is desired to produce only one grade or kind of product, the entire mass in the precipitator or mixer 52 may be passed directly through line 79 to the precipitator 80 without separating out the heavies. This is done when it is desired to combine the heavies made in the precipitator 52 with products to be made in the precipitator 80, as will be explained hereafter.

In the precipitator or mixer 80, the pH is raised another step. It may be raised higher than 7 for making certain higher alkali products, but preferably is held to approximately 5 or 5.5, when making mostly dicalcium phosphate for example. It is made practical to operate the final stage at pH 5–5.5 because of features of the present invention. The pH is raised in this tank 80 by adding alkali from an alkali source 81 to a mixer 82, which also may receive water at 83, or recirculated liquor as will later appear. The relatively alkaline material is then conducted by a pipe 84 into the tank 80 in an amount proper to bring the pH in the tank 78 to the desired value.

The material, thoroughly mixed in the precipitator 80, is conducted from the tank 80 by a pipe 85 into a settling or holding tank 86 which is similar to the previously mentioned one. The liquor from the tank 86 may be conducted by a pipe 87 into a pipe 89 for a purpose to be explained hereafter.

The heavies from the settling tank 86 may be conducted by a pipe 90 into a separator 91. From this tank, relatively pure liquor may be conducted by a pipe 92 out of the system through appropriate valving. This material may be the principal phosphate material, as will appear.

The liquor in the pipe 92 may selectively be delivered, by way of a valved pipe 95, wholly or partly into a pipe 96, that connects back into the system as will appear. Or it may be delivered by a valved pipe 97 into the pipe 98 to enter the alkali mixer devices as will appear.

It may be observed that the liquor from the settling tank 86 leaving by the pipe 87 connects by the pipe 89 either through a valve into the pipe 96, or through a valve into the pipe 98. The result of these connections is that liquor from either tank 86 or 91 may be selectively directed to either the pipe 96 or the pipe 98 at any time.

The heavies from the separator 91 may be conducted out through a pipe 100 into the processor 101, which is illustrated as a dryer. The final product, of food or other high grades, may be conducted out through a pipe 102. By closing valves, any soluble phosphates can be made to combine with the phosphates from the pipe 102 for sale as such, or after removing the water or undesired constituents.

Needless to say, the number of stages of purification can be anything from one up to a large number. It is desirable that the pH not be raised too abruptly and, therefore, the number of stages may be increased to minimize the shock of added alkali, in each stage and reducing the possibility of formation of alkali pockets in the mixing operation, or of formation of undesired products.

Recovery of Phosphatic Materials From Impure Heavies of the Leaching Operation Before considering recirculation of liquor, the description will proceed to the treatment of the heavies from the leaching stage, the primary purpose of which treatment is to recover phosphate therefrom. This is a counterflow arrangement, comprising several successive mix-separator combinations successively receiving the solids in one direction and the liquids in the opposite direction.

The first separator 16 in the cleaning stage delivers its heavies by the pipe 26' into a second mixer 125. The materials in that mixer 125, in turn, are delivered by a pipe 127 to a second separator 128. The solids from it, in turn, are delivered by a pipe 129 to a third mixer 130. The materials are discharged from this mixer 130 by a pipe 131 into a separator 132. Heavies may discharge from the separator 132 by a pipe 133.

The liquids are primarily introduced into this counterflow arrangement at the mixer 130. The purpose is to produce an aqueous wash or diluent of predetermined pH values throughout. To attain the aqueous diluent, water and acid (one of the acids previously mentioned) may be mixed and then introduced onto the heavies. Preferably liquors already acidic are recirculated from the purification stages as a source of aqueous diluent, subject to necessary pH adjustment, since it has been learned that better and faster separation is obtained thereby than by using certain raw waters from outside the system.

In the drawing, a water supply for the mixer 130 is shown at 135, an acid supply at 136, and a recirculation connection from the pipe 96 at 137.

The diluent is of a pH to provide a pH in the mixer 130 of about 2.0–3.0, preferably 2.0. The diluent takes up phosphates from the heavies in the mixer 130 and the separator 132, and carries them by a pipe 136 into the mixer 125. There additional acid may be needed to hold the pH at about 2.0–3.0, preferably 2.0, and this may be supplied at 137.

The liquor from the separator 128 flows out by a pipe 138 to enter the first mixer 12, so as to cause phosphate-containing materials to be removed for purification, and to keep a low pH in that mixer. However, some or all the liquor may be directed by the valved branch 139 into the pipe 25, which is especially useful if there is a tendency of the pH to get too low in the mixer 12.

The heavy material flowing from the bottom of the separator 132 by the pipe 133 may be withdrawn from the system at 141, or may be introduced into the acidification mixer 142. Therein, the material is acidified to keep the pH to about 2.0–3.0, as by adding acid in controlled quantities from a source 144, water from a source 145, and with, perhaps, some recirculated liquor from the pipe 96 by a valved branch 146.

The material, after mixing in the mixer 142, is then conducted by a pipe 148 into a separator 149. From this separator, the final solid material, containing most of the impurities, may be conducted out by a pipe 150. It thereby leaves the system.

The liquor from the separator 149 may be conveyed to several places in chosen proportions. It may be conveyed back by a pipe 152 into the pipe 25 and thereby sent into the purification stages. Or it may be conducted to a pipe 153 and thence either through a valve and a pipe 154 into the mixer 12, or by a pipe 156 into the initial rock acidification 10. The purpose of returning the liquor from this final separator back to other stages in the system is to recover all of the phosphate therefrom that is possible, and also to take advantage of its acidic quality in lowering the pH in earlier stages more readily than could be done with ordinary raw water (i.e., water not previously used in this system).

Recirculation of Liquors and Solids From Purification Stages

The solid material from the first stage separator filter 40 that passes through the pipe 44 may alternatively be delivered, as previously described, by pipes 46 and 47 into the rock acidification stage 10. Where the procedure starts with monocalcium phosphate or equivalent in the dilution-separation stage, this solid material or filter cake may be introduced by the pipe 48 into the mixer 12.

There is also recirculation of liquors from the purification stages. In a first purification stage, wherein the pH is relatively low, the settling tank 37 can deliver its liquor to the pipe 38 where it may be joined with liquor from the separator 40. In any case, the pipe 38 connects into the pipe 96. This pipe 96 can deliver liquor to a number of different sources, depending on the operation of the valves. It may deliver liquor into the acidification mixer 142 by the pipe 146. It may also deliver liquor by the pipe 137 into the mixer 130 of the counterflow washing system, or, in turn, may deliver by a pipe 158 into the first mixer 12, or by the pipe 159 into the original phosphate rock acidification stage 10.

Ordinarily, the liquor from the early stage of purification will be sent to the subsequent purification stages for further recovery of phosphatic product. However, this is not always done, as for example when the phosphatic product is only to be fertilizer grade material, the liquor should be recovered. But even when purer product is to be obtained, it may be desirable to use the acid quality of this liquor in other stages, since returning it preserves its phosphatic content in any event.

Another recirculation system involves the delivery of the liquor from the purification stages to the alkali mixers 29, 58 and 82 that are employed to raise the pH in the purification stages.

It will be seen that the liquor from the separator 40 of the first purification stage is delivered to a pipe 42, and it can pass through a pipe 165 into a branch 166 and thence by a pipe 167 into the mixer 29; or alternatively, by a pipe 168 into the pipe 169 leading to the mixer 58, or into a pipe 170 to a pipe 171 into the mixer 82. Thus, this liquor from the first stage separator 40 may be introduced into any one or more of the three alkali mixers 29, 58 and 82. In similar manner, the liquor from the second stage separation can be delivered from the separator or filter 70 by the pipes 71 and 65 into a pipe 176, which leads to a pipe 177 that connects into the pipe 167 leading into the mixer 24. Also, this liquor may be delivered by the pipe 177 to the pipe 169 leading into the mixer 58. Likewise, liquor in the pipe 176 may be delivered to a pipe 178 into the pipe 171 leading into the mixer 82.

In similar manner, the liquor from the third stage of purification may be led by the pipes 89 and 98 to connect to the pipe 182 into the pipe 167, to deliver into the mixer 29, of by the pipe 183 to deliver into the pipe 169 and the mixer 58, or by a pipe 184 to deliver into the mixer 82.

In order to render the alkalinization most flexible, the alkali mixer outlets 32, 60 and 84 are connected together to permit any interconnection to enable any degree of acidity or alkilinty to be obtained in any purification stage. This may be accomplished by connecting the pipes 32 and 60 by a pipe 190; and by connecting the pipes 60 and 84 by a pipe 191.

Controls in the Process

As has been stated, the process can begin with the manufacture of monocalcium phosphate, as from phosphate rock. The acid used may be one of several acids, such as sulfuric, phosphoric, nitric and hydrochloric, etc., or mixtures thereof, as aforesaid. Sulfuric is the preferred acid, since it produces an insoluble precipitate in the form of calcium sulphate and water-soluble monocalcium phosphate. Also sulfuric acid is less expensive than most other acids that are useful in this connection. The water, acid and rock materials, together with such recirculated products, are so proportioned as to provide a pH of 2.0 or thereabout in that stage. It is desirable to maintain the pH in these early stages low, so as to dissolve the phosphorus and minimize the precipitation of dicalcium phosphate along with the impurities. As the description proceeds, it will appear that the pH is controlled throughout the entire system.

The materials from the first acidification stage 10, usually in a relatively dry, pasty stage, are passed through the mixer 12 where the diluent is supplied. It comes primarily from the wash liquor via pipe 138, but may be supplemented by recirculated liquor from the separator 149 via pipes 153 and 154, or from the purification stages via pipes 96 and 158, or by acid and water from 14 and 13. While the pH may rise somewhat, it is maintained relatively low, and should not rise above about 3.0 to 3.3, but is preferably held at about 2.5. This pH is kept low lest substantial quantities of dicalcium phosphate precipitate. However, at this pH, a major part of the fluorides will be solids. The increase of pH in the mixing stage may be regulated by observing when precipitation of dicalcium phosphate begins, and stopping the increase in pH at that point.

The recirculation liquors from the subsequent stages of the process may reduce (or eliminate) the amount of acid required to be introduced at this stage. It has further been found that the quality of phosphate yield is improved by using recirculation liquors for acidifying the diluting, over the yield when certain raw waters are used. Finally, these liquors may contain phosphatic materials than can be recovered by reprocessing the liquors through the system.

The material flows from the mixer or blender 12 through the pipe 15 into the separator 16, and impurities which may comprise calcium sulphate, iron, aluminum, and fluorine compounds, and especially the last, are rendered separable. As heretofore noted, the water and acid in the leaching and washing operations are proportioned so that the pH will preferably be held at around 2.0 (and certainly less than 3.3) to minimize dissolving of the fluorides and to dissolve as much as possible of the phosphatic material. This differential acidification, to keep phosphates dissolved and the impurities solidified, is an important part of the process.

In the counterflow washing stages, additional acid may be required in individual stages in order to maintain the pH low, such as at approximately 2.0. The recirculated liquors introduced at 137 are employed to reduce the amount of raw water and new acid required, but at this point it is particularly noticeable that the use of recirculated liquors gives better separation than do certain ordinary raw waters.

The additional acidification of the heavies from the separation stages in the elements 142 is done to insure precipitation of impurities to the maximum degree. These elements 142 and 149 can be omitted, especially when the pH in separator 132 is held low, as to about 2.0. However, when the pH in 132 is higher (to minimize fluorine going to line 25), the final acidification is especially valuable, since it can reduce the pH to dissolve phosphates from the heavies obtained from the separator 132.

The liquor obtained from the separator 149 will ordinarily not be sent by the pipe 152 to the pipe 25, but will go by 153 to the rock acidification at 10, or to the mixer 12. The phosphate is thereby not lost. The fluorine with this liquor in 153 does not contaminate 25, and does not seem to accumulate even in the earlier stages. Presumably much of it vaporizes off in the rock acidification.

The recirculated liquors may be those having a relatively high pH. The increase in pH in the final purification stage may be stopped at about 5.5–6.0, because the liquors may be recirculated, avoiding loss of phosphorus. The liquor from the settling tank 86 is normally clear, and can be conducted back as the principal liquor in the pipe 96. It has been found that recirculation of this liquor many times does not cause accumulation of excessive amounts of impurities into the product, and yet saves acid, and water, and improves separation in the cleaning stages. Also, the repeated recirculation accumulates certain valuable products into sufficient concentrations to enable them to be recovered.

The liquor from the cleaning stages is passed by way of the pipe 25 into the first purification stage. This liquor comprises the monocalcium phosphate in solution, together with other phosphatic materials that may have been recovered by the counterflow washing. It also contains some degree of impurity. In the first purification stage, the pH is raised to about 3.3 maximum, and preferably 2.7–2.9. With the use of unusually green superphosphate, the pH may be required to go slightly higher.

When the pH is raised in the first purification stage in the precipitation mixer 26, in the holding tank 37, as well as the filter or separator 40, fluorine, iron, aluminum and other impurities precipitate down, leaving a liquor, which, as already noted, may be a clear liquor at this stage. The alkali used to increase the pH may be calcium oxide, calcium hydroxide, calcium carbonate, by-products that contain such materials such as that from acetylene manufacturers, etc. Also, when the phosphate liquor being purified contains monocalcium phosphate, a wide latitude of pH-raising substances is possible, as calcium is present to precipitate the fluorine. Recognizably there are many sodium, ammonium and alkaloid compounds that will raise the pH. For instance, soda ash is an inexpensive material of this type.

Description has already been made of the disposition of the liquors from the first stage of purification. The solids from the first stage of purification are illustrated as having three alternative dispositions. They may be dried in the dryer 45 or otherwise processed, and because of their comparative impurity may be converted into fertilizer. However, since they contain some phosphate they may be returned to the system in either of two places. They may be returned to the leaching stage, and specifically mixer 12, where due to the acidity and carefully controlled pH throughout the countercurrent washing of the solids, phosphorus goes into solution without all the fluorine and other impurities being dissolved. As another alternative, these impurities containing phosphorus may be returned via lines 46 and 47 to the phosphate rock acidification box 10, wherein the phosphate will be acidulated in a form that can easily be leached in later stages that follow. In this case, much of the fluorine will be driven off into the air or a fluorine recovery tank, not shown.

The second purification stage is operated at a higher pH, which is obtained by controlling the amount of the materials from the mixer 58 added to the precipitator 52. At a pH of about 4, dicalcium phosphate may be obtained that is of feed grade, particularly since substantial amounts of the impurities were removed from the liquor during the first stage of purification.

The liquor, therefore, that is derived from the tank 63 and the filter 70 in the second stage is introduced into the third stage of purification by the pipes 64, 65, 71 and 76. It may be further raised in pH therein for final purification. It is desirable not to alkalize the material in stages that are too abrupt because of the difficulty in obtaining a complete dispersion of the alkali in the phosphatic material and the avoidance of pockets of excessive concentration.

The filtrate from the separator 91 of the last stages of purification may not be as clear as that obtained from the tank 86 in this stage. It usually contains fine particles of phosphate. If these particles were recirculated through the pipe 96 and back into the washing and leaching stages, they possibly would go out with waste impurities. Also, in these earlier stages of the process, the phosphate particles would require the addition of more acid to redissolve them. The present invention, therefore, includes an important feature in returning the clear filtrates of lower phosphorus content back into the previous stages of the process, where their phosphates may be recovered; and in returning the filtrates that may contain small particles of phosphate into the alkalinization (or pH-raising) stages where the particles may be enlarged or otherwise recovered.

It has been found that, generally, the phosphorus in solution in the filtrates above-mentioned is of such low potency and the solvents are already sufficiently neutralized that excessive basic alkali phosphate in the final product is not a problem that results from this recirculation.

Of course, if it becomes known by suitable checking that the recirculation of the filtrate from the purification steps back to the alkalizing steps is causing an accumulation of excessive impurities, the filtrate can be returned to an earlier stage of purification where such impurities are of no significance. Thus, if the impurities in the filtrate from the separator 91, in the third stage of purification, are such as would render the phosphate product not usable as food, the valving will be set to introduce this filtrate at the earlier fertilizer or feed stages of purification, as the case may be. Hence, the present system recovers the phosphatic materials present in these filtrates and also reduces the amount of alkali required to be added, but does not adversely affect the purification of the ultimate product.

It is important to note that, heretofore, the phosphate recovery systems have usually raised the final pH in the purification stages to neutral or even more, in order to insure that all of the valuable phosphate is precipitated out. In the present system, it is less critical that the filtrate contain no phosphatic materials because that filtrate is returned to the system at one or more earlier points, so that it can be recirculated for recovery of the phosphates. By keeping the pH thus higher in the final stages, a purer product results. Also, the liquor can be used, back in the earlier stages of the process, without excessively raising the pH.

*Double Products*

The present process can be used to process two kinds of phosphates at the same time. An example is producing dicalcium and sodium phosphate simultaneously.

This may be accomplished in several ways. Assuming that the alkali admitted into the system at 28 is, for example, soda ash, sodium hydroxide, or an ammonium of suitable form, the effect will be to cause the impurities such as fluorine, iron and aluminum impurities to come down as heavies and the phosphorus materials to remain in solution to at least a major extent. Thereby the sodium or ammonium phosphate and remaining calcium in solution can be drawn off at 42 from the filter-separator 40 and sent to the precipitator 52 where additional alkali is added. This causes precipitation of relatively pure dicalcium phosphate and leaves sodium phosphate as a product to be recovered from the solution after filtering out the dicalcium. By running this solution to still higher pH a trisodium phosphate, for example, can be made.

It is also to be noted that it may be desirable not to make a complete separation of dicalcium phosphate from the filtrates. Sodium phosphate can be improved for certain purposes by including in it the fine abrasive property offered by dicalcium phosphate. This is particularly true where the sodium phosphate is to be used as a detergent.

The present system can thereby obtain, at low cost, a desirable combination of sodium and calcium phosphates.

With the stages of purification such as are illustrated, the present system may add certain calcium alkalis, such as lime, in the first stage of purification to precipitate dicalcium phosphate which, in turn, may be separated out for feed purposes.

Thereafter, the filtrate may be subjected to addition of sodium alkali to raise the pH as aforesaid to produce more dicalcium phosphate, which may be left to go with the sodium phosphate. In other words, if the major part of the dicalcium phosphate is eliminated in the first or second stage of purification, then the use of sodium as an alkali, in a subsequent stage, can be performed in such wise as to leave the remaining dicalcium phosphate with the solid sodium phosphate derived from the filtrate. It seems fairly evident how the system would be operated to obtain these and other combinations.

In short, by selecting the amount of any alkali, or the ratio of one alkali to another, and the stage in the process where it is introduced, the system may produce almost any phosphates of this type, in almost any combinations. When starting with monocalcium phosphate, some dicalcium phosphate appears to be an inevitable product.

It is highly desirable to introduce the alkali into the solution in such a manner as to prevent excessive alkalinity or spots of excess alkalinity. It is also necessary to avoid such mechanical disturbance of the liquor as would break the crystals of the phosphatic material. Similarly, it is undesirable to permit temperature of the alkali or the solution to become too high. Appropriate means may be taken to avoid the foregoing problems and also to avoid encrustation of the alkali inlet.

It has been thought that calcium phosphate made from rock phosphate and acid required aging before use in order to maintain purity. While there is no objection to the aging step, it is unnecessary in connection with the present procedure. It has been found that the new process here set out enables treatment of superphosphate or triple superphosphate when it is green.

Before the drying of the product is completed, an organic material such as the by-product "Stik" or steep water, molasses, starch, grains, and many other such materials may be added to the dicalcium phosphate. They aid in the drying and produce an improved product for the feed trade.

In cases where it is not objectionable, as in animal feeds, an acid or other product to aid hydroscopicity may be added to the dicalcium before it is dried to improve its drying rate and to improve the particles dried.

What is claimed is:

1. In a process of the kind described for producing phosphatic material from phosphate rock, the steps of: acidifying phosphate rock by mixing therewith at least one acid from the group consisting of sulfuric, phosphatic, nitric and hydrochloric acids, and water, and providing a pH of about 2.0; subsequently mixing and diluting the acidified phosphate rock with water to raise the pH to about 2.5 and not above about 3.3 and stopping the elevation of the pH before substantial precipitation of dicalcium phosphate occurs; leaching the aforesaid mass and producing separable impure solids and a phosphatic liquor relatively free from but containing some separable impurities, the solids relatively free from but containing some phosphates and the impurities comprising at least one of the group consisting of calcium sulphate, iron, aluminum and fluorine; separating the liquor and solids, purifying the liquor in a first purification stage by adding thereto an alkali that is at least one of the group consisting of lime, sodium carbonate and limestone; and raising the pH to about 2.7 and not over about 3.25; thereby precipitating impurities including fluorine and leaving the phosphates largely in solution; and also adding a defluorinated phosphate to the liquor in the first purification stage whereby to cause the fluorine of the liquor to combine therewith, and thereby reducing the amount of alkali required and reducing the degree of elevation of the pH required; separating the materials into a relatively purified liquor and solids; conducting the liquor to a second purification stage, and therein alkalizing it as in the first purification stage to further raise the pH to about 4.0 and precipitate additional, and purer, solids from the liquor; separating the solids from the liquor; conducting the liquor to a third stage of purification, therein further alkalizing it as in the first and second stages and further raising the pH to at least about 5.0 and precipitating additional solids of high purity; passing the impure solids from the leaching stage, through at least two separating stages subsequent to the leaching stage, including introducing water and acid that is at least one of the group consisting of sulfuric, nitric, hydrochloric and phosphatic acids, as a diluent to the final such separating stage; producing a pH therein of about 2.0–3.0; taking up phosphates from the solids in the said final stage, into the diluent, and transmitting the resulting diluent to the preceding stage of separation, in said preceding stage maintaining a pH of about 2.0–3.0 by adding thereto one of the acids of the previously named group as needed; taking up phosphates from the solids in such preceding stage, into the diluent, and transmitting the diluent thus in counterflow to the solids, and finally mixing it with the initial leaching liquor; introducing solids from the first purification stage into the mass to be leached; introducing liquor from a purification stage into the process upstream of the leaching separation step, and into the diluent of the final separating stage for the impure materials derived from the leaching step; further acidifying the solids from the final separating step of the impure solids from the leaching step, by adding thereto acid from the previously described group, and acid from the purification steps as aforesaid thereto; returning acid liquor therefrom into the process upstream of the leaching separation, and downstream thereof into the liquor from the leaching separation, and recirculating liquor obtained from the liquor separation in a plurality of the purification stages into the alkalization steps of the purification stages.

2. In a process of the kind described for producing phosphatic materials from impure phosphatic materials comprising monocalcium phosphate, and impurities that include at least one of calcium sulfate, iron, aluminum and fluorine; the steps of leaching from an aqueous mixture the impure phosphatic materials while maintaining a pH of about 2.0–3.0 by use of acid of the group consisting of sulfuric, phosphatic, nitric, and hydrochloric acids; deriving from the leaching a relatively pure phosphatic liquor and relatively impure solids; separating the liquor from the solids; conducting the solids through a plurality of successive washing stages, introducing into the last such stage, water plus acid from the group hereinabove identified, providing a pH of about 2.0–3.0 in such stage, taking up phosphatic material from the solids into solution in the wash liquor, conducting the wash liquor counterflow through the other washing stages to pick up additional phosphatic material therefrom; and finally introducing the wash liquor into the process to add its phosphatic content to the relatively pure phosphatic liquor from the leaching step.

3. In a process of the kind described for recovering phosphate from an acidic phosphatic material that contains dissolved monocalcium phosphate and undissolved impurities, the impurities being at least one of calcium sulfate, iron, aluminum and fluorine, the steps of separating the dissolved phosphate liquor in one phase relatively free of impurities, from the solids in a second phase relatively free of phosphate, conducting the solids through a plurality of successive washing stages, introducing into the last such stage, an aqueous liquid of pH about 2.0–3.0 in which the acid component is at least one of the group consisting of sulfuric, hydrochloric, nitric, and phosphatic acids, providing a pH in such stage of about 2.0–3.0, taking up phosphate into solution in the wash liquor from the material in such stage; conducting the wash liquor counterflow through the other washing stages to pick up additional phosphate therein; and finally introducing the wash liquor into the process at a point to add its accumulated phosphate to that of the liquor phase in the first separating step.

4. The process of claim 3 including the steps of treating the separated phosphate liquor in a succession of like purification stages in each of which it is treated with alkali to raise its pH by an increment of about 1, and in each of which phosphate solids are obtained, the solids being of increasing purity in successive stages, and a purified liquor is obtained and is sent to a subsequent stage for the treatment therein; and wherein liquor from at least one purification stage is added to the liquor in the washing stages of the earlier impurities phase.

5. In a process of recovering phosphate from a liquid material of a pH of about 2.5 that contains dissolved monocalcium phosphate, and impurities, the impurities being at least one of calcium sulfate, iron, aluminum and fluorine; the steps of purifying the material in successive stages, by mixing the same with an alkali and raising the pH to about 3.0 in a first purifying stage and causing impurities and some phosphate material to separate from a phosphate liquor of improved purity; adding additional alkali to the phosphate liquor of improved purity in a second purification stage, raising the pH thereof by at least 1 and causing additional impurities and phosphate to separate from a phosphate liquor of further improved purity; the alkali being at least one of the groups of sodium, ammonium and calcium compounds, together with liquor from one of the purification stages.

6. The process of claim 5 wherein the alkalinization in the last purification stage is brought to a pH of about 5.0, and the liquor from this stage is conducted back and used in alkalizing in the purification stages.

7. The process of claim 6 including the steps of directing the liquor back to an earlier stage of purification than said last stage when the solid product of the last stage develops excessive impurities.

8. The process of claim 5 wherein the process includes the initial steps of phosphate rock acidification and leaching to produce the starting liquid of claim 5, and wherein the impurities and phosphate separated from the liquor in the first purification stage are conducted back to one of the said initial steps to be passed through the process again.

9. The process of claim 5 wherein the materials are successively purified in such stages by increasing the pH by about 1 per stage, until the pH in the final stage is about 5.0, directing liquor from the last stage back to an earlier point in the process for recovery of any phosphate therein, and recovering solid material from the final stage.

10. The process of claim 4, wherein the alkali used in the first stage of purification is one producing soluble phosphate compounds, whereby the liquor from such stage includes the major part of the phosphates therefrom, and the said liquor is directed to the second stage of purification wherein the further alkalining is produced by an alkali that causes precipitation of dicalcium phosphate.

11. In a process of recovering phosphate from a liquid of a pH of about 2.5 that contains dissolved monocalcium phosphate, and impurities, the impurities being at least one of calcium sulfate, iron, aluminum, and fluorine: the steps of purifying the material in successive stages, by mixing the same with an alkali and raising the pH to about 3.0 in a first purifying stage, causing impurities and some phosphate material to separate from a phosphate liquor of improved purity; adding additional alkali to the phosphate liquor of improved purity in a second purification stage, raising the pH thereof by at least 1, and causing additional impurities and phosphate to separate from a phosphate liquor of further improved purity; the alkali being at least one of the group of sodium, ammonium and calcium compounds, and including the step of adding defluorinated phosphate to at least one of the stages of purification along with the alkali.

References Cited by the Examiner

UNITED STATES PATENTS

| | | | |
|---|---|---|---|
| 2,759,795 | 8/56 | Archer | 23—109 |
| 2,767,045 | 10/56 | McCullough | 23—109 |
| 2,857,245 | 10/58 | Fallin | 71—37 |
| 2,869,997 | 1/59 | Atkin | 23—109 |
| 3,033,669 | 5/62 | Strauchen et al. | 71—39 |

MAURICE A. BRINDISI, *Primary Examiner.*